United States Patent

[11] 3,612,309

| [72] | Inventors | Donald W. Van Doorn;<br>James B. Hawkins, both of Columbus, Ga. |
|---|---|---|
| [21] | Appl. No. | 851,014 |
| [22] | Filed | Aug. 18, 1969 |
| [45] | Patented | Oct. 12, 1971 |
| [73] | Assignee | Lummus Industries, Inc. |

[54] APPARATUS FOR MOVING BALES OF FIBERS OR THE LIKE FROM A BALING PRESS
5 Claims, 7 Drawing Figs.

[52] U.S. Cl. .................................................. 214/91,
198/34, 214/1 Q, 214/130 R
[51] Int. Cl. ...................................................... B65g 47/08
[50] Field of Search ........................................... 214/91, 92,
6 C, 1 R, 130 A, 130 B, 130 C, 130 R, 77; 198/33
R; 100/218, 188

[56] References Cited
UNITED STATES PATENTS

| 1,977,497 | 10/1934 | Springer | 214/6 C |
| 2,361,222 | 10/1944 | McBride | 214/91 |
| 2,508,698 | 5/1950 | Von Beren | 214/6 C |
| 3,286,854 | 11/1966 | Crawford | 214/1 R |

*Primary Examiner*—Albert J. Makay
*Attorney*—Jennings, Carter & Thompson

ABSTRACT: A system for moving bales of fiber or the like from a baling press to a discharge point which includes a powered vehicle having a tiltable bale receiving carriage movable from position to receive the bales to a position gently to discharge the bales. A control system automates the travel of the vehicle between the pickup and discharge positions and causes the carriage to move into bale receiving and bale discharge attitudes at the proper time. The control system also may space the bales from each other on the floor or place them on a conveyor. Also, a bale ejecting mechanism of the press may be included in the control system thus to cause the vehicle automatically to position itself in bale receiving position.

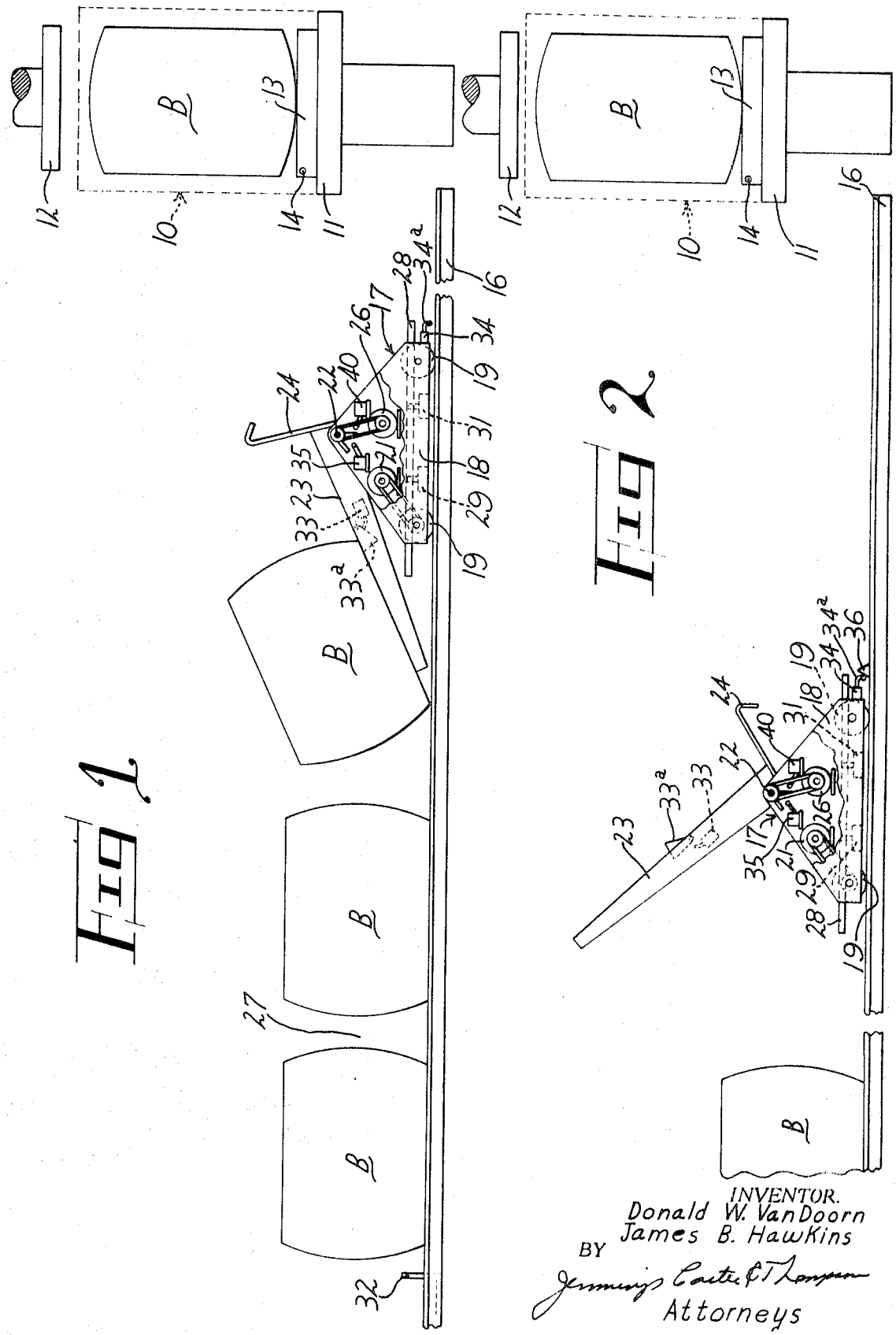

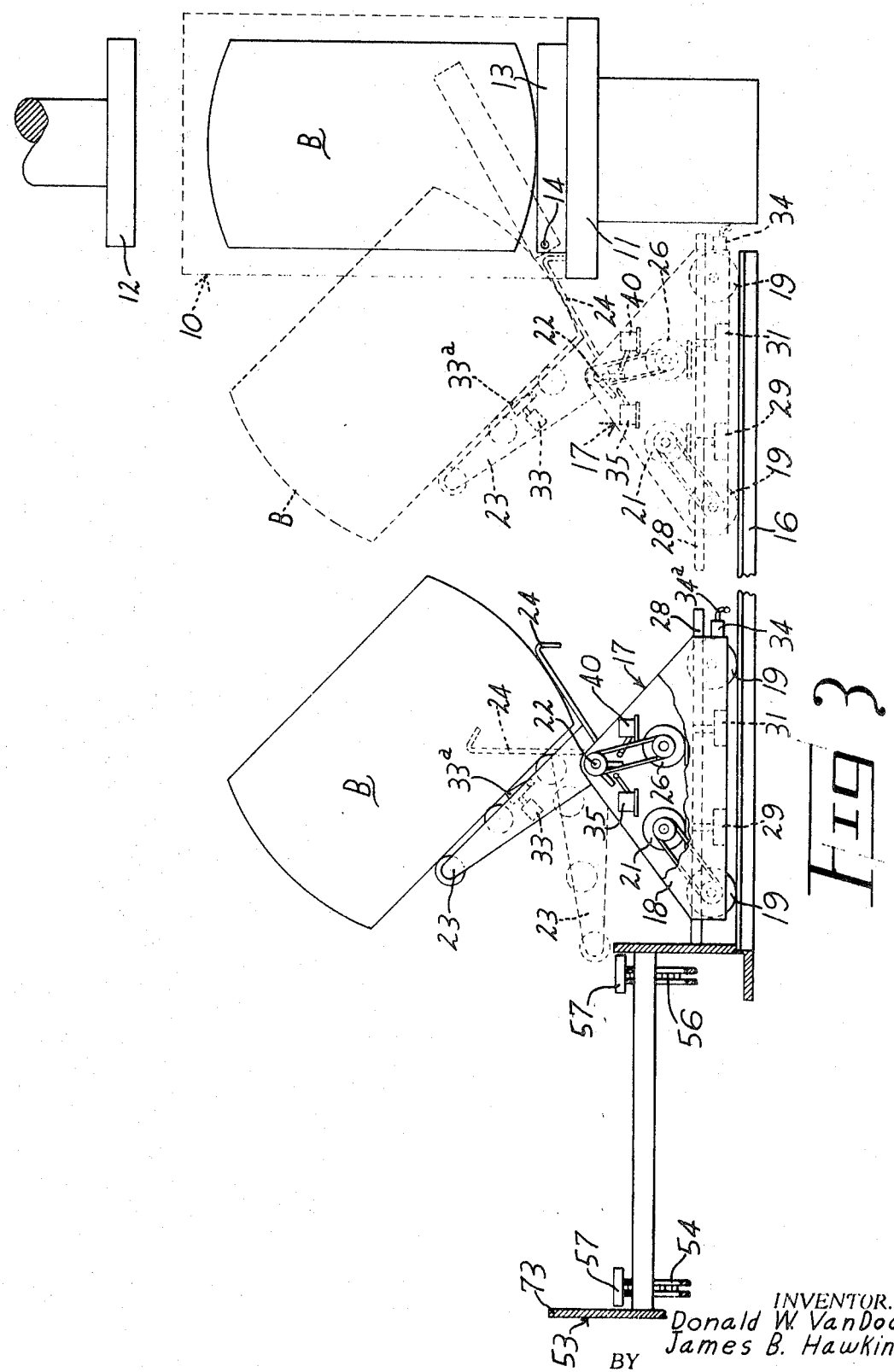

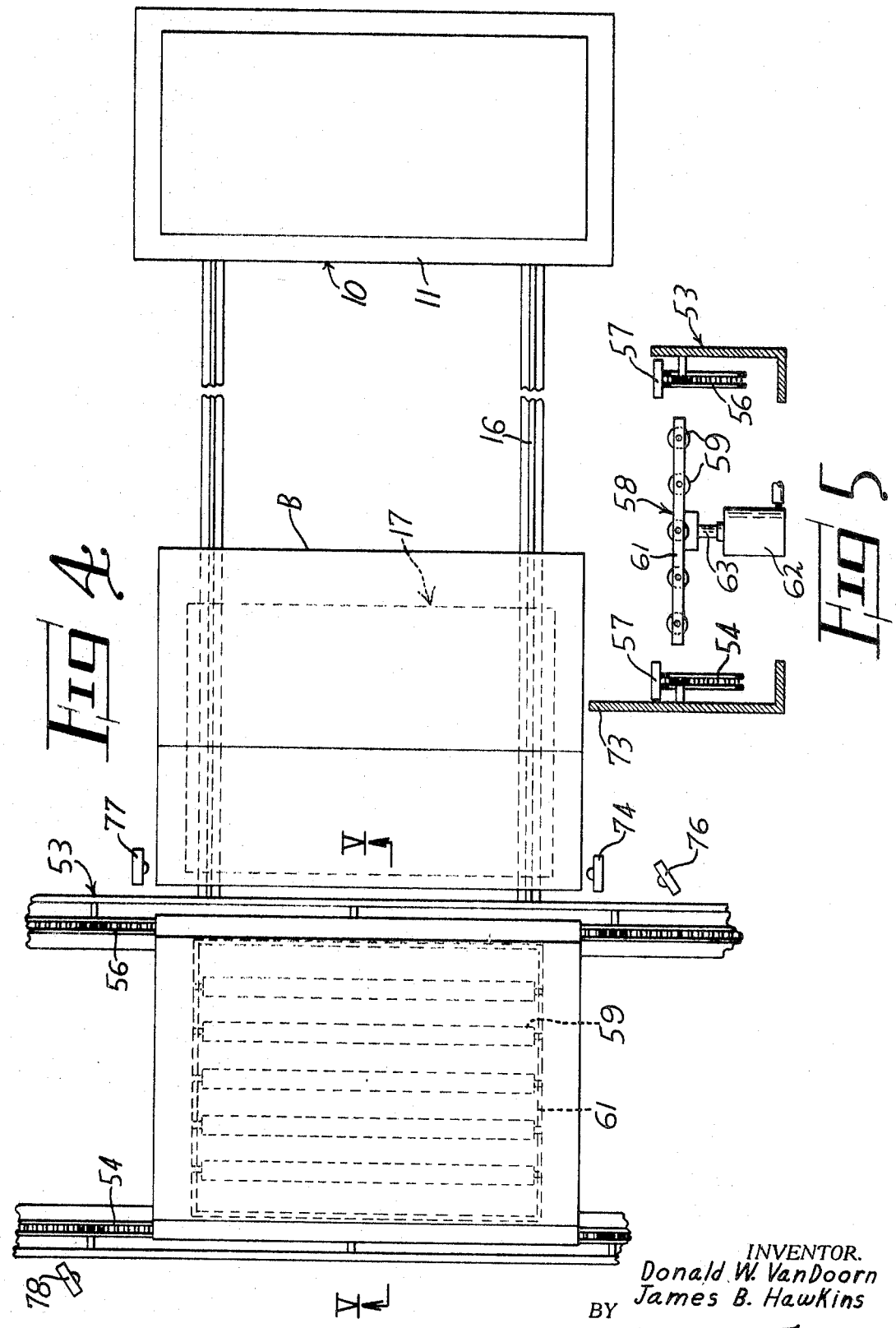

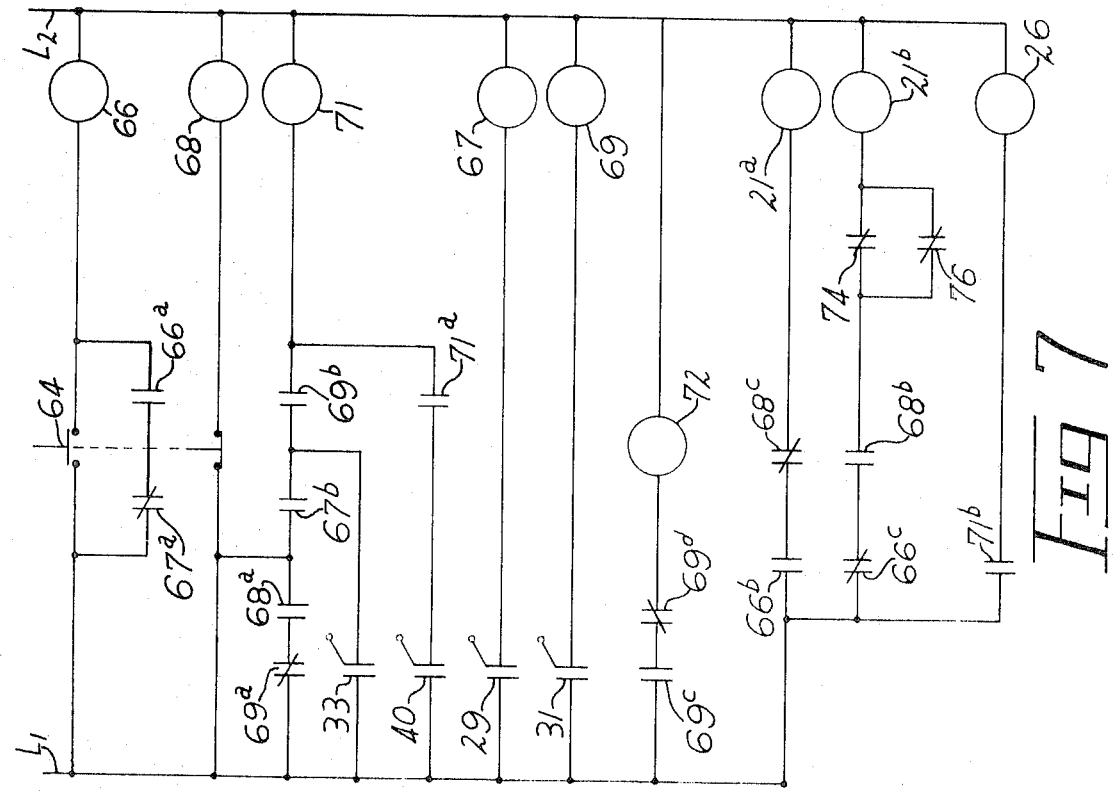
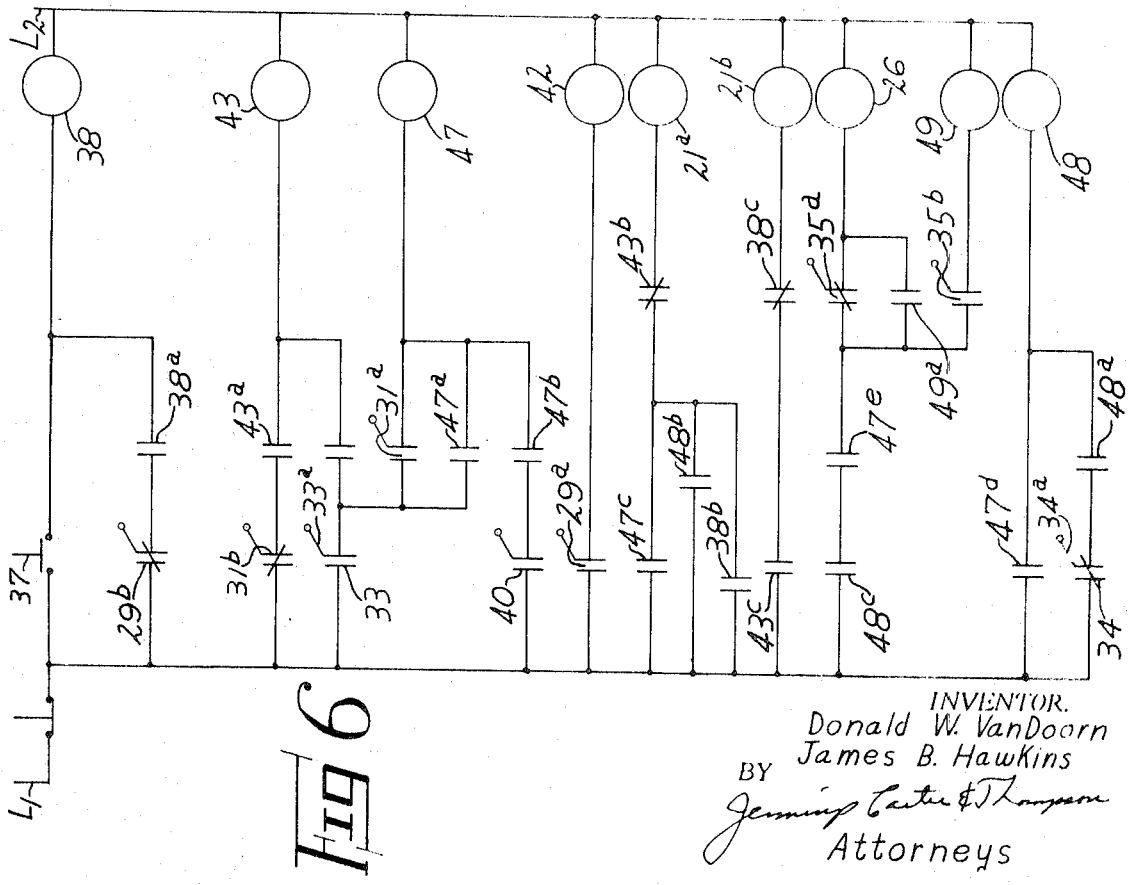

APPARATUS FOR MOVING BALES OF FIBERS OR THE LIKE FROM A BALING PRESS

Our invention relates to a system of transporting bales of fibers and the like from a baler to a position removed from the baler and has for an object automated apparatus effective upon ejection of the bales from the press to receive the bales, move them to a discharge position and return to a ready station clear of the press, awaiting a signal to move to the press for another bale.

More specifically, our invention relates to apparatus of the character designated in which the vehicle is driven by a reversible electric motor or the like and in which the tiltable bale receiving carriage is also driven by a motor, together with controls operable to cause the vehicle and carriage to move in such manner and sequence that a bale is gently received from the press, transported to a discharge point, gently discharged from the vehicle and the vehicle then moves again toward the press but clear thereof, awaiting a signal to move again into bale receiving position.

A more specific object is to control the movement of the vehicle and carriage so that the bales are discharged on the floor in a row, but spaced from each other, so that each bale may subsequently be picked up by lifting means such as a clamp truck, the grippers of which enter the spaces between the bales.

Another specific object is to control the vehicle and carriage in such fashion that the bales are deposited onto a conveyor raised above the floor level and to do so without undue jolting or rough treatment of the bale, and further to deposit the bale on the conveyor only during times when there is no interferring bale present on the conveyor.

Apparatus illustrating features of our invention is shown in the accompanying drawings forming a part of this application, in which:

FIG. 1 is a wholly diagrammatic, fragmental side elevational view of our improved system for dumping bales on the floor, in a row, the vehicle being shown in position just discharging a bale;

FIG. 2 is a view corresponding to FIG. 1 but showing the vehicle en route from just having delivered a bale back to the ready station;

FIG. 3 is a diagrammatic view showing our improved system used to deposit bales onto a conveyor, the view being partly broken away and in section;

FIG. 4 is a plan view of the apparatus shown in FIG. 3, partly broken away and in section;

FIG. 5 is an enlarged detail sectional view taken generally along line 5—5 of FIG. 4;

FIG. 6 is a wiring diagram for control means for the apparatus shown in FIGS. 1 and 2; and, FIG. 7 is a wiring diagram for control means for the apparatus shown in FIGS. 3 and 4.

Referring now to the drawings for a better understanding of our invention we illustrate diagrammatically at 10 a baling press which may have a box indicated by the dotted lines, a lower bale support 11 and an upper, movable platen 12. The fiber baling press may be equipped with discharge skids or sleds indicated at 13 and which are pivoted at 14 to a stationary part of the press. These sleds or skids are described more particularly in application Ser. No. 758,916 filed Sept. 10, 1968, in the names of Donald W. Van Doorn, William C. Pease III and Jack L. Colquett which application is assigned to the assignee of the present application. Suffice here to say that upon proper actuation the right-hand ends of the skids as viewed in FIGS. 1 and 2 pivot upwardly about the pivot point 14, thus to cause the bale to tilt and fall outwardly of the press, that is to the left, as shown in these figures, thus to be discharged on the carriage of our improved vehicle.

On the floor of the room in which the press is located there may be rails 16. It is on these rails that our improved vehicle indicated generally at 17 moves from the baling press to the bale discharge position as will presently appear.

The vehicle 17 comprises essentially the vehicle portion proper indicated at 18 and which is mounted on wheels 19, which ride on the rails and at least some of which are powered by means of a reversible electric motor diagrammatically indicated at 21. Pivotally mounted between side plates of the vehicle as at 22 is the bale receiving carriage 23. The carriage may have a lower bale supporting member 24 which serves the purpose of supporting the bale, generally in vertical position as it is received from the press. The carriage 23 may be rotated from the bale receiving position generally indicated in FIGS. 2 and 3 to the bale discharge position indicated in FIG. 1, by means of a reversible electric motor 26.

Viewing FIGS. 1 and 2 it will be seen that the object is to receive the bales B as they are formed in the press and to transport them to a position away from the press, to deposit them on the floor, with spaces 27 therebetween. Furthermore, when the bale has been discharged it is desired that the vehicle move back to a ready position but away from the press so that the doors thereof may be opened.

Mounted on the vehicle is a spring centered, slidable rod or switch arm 28. Operatively connected so as to be actuated when the switch arm 28 is shifted are switches 29 and 31. That is to say, when the vehicle moves into bale receiving position the right-hand most end of the actuating rod 28 strikes a portion of the press, moving the rod 28 to the left and actuating the switches as will be explained. Further, for delivering the initial bale B we provide a raised stop member 32 which is adapted to be engaged by the opposite end of the switch arm 28, thus to actuate the switches in another direction as will presently appear.

Mounted on the carriage 23 is a normally open electric switch 33. The switch 33 has an actuating arm 33a adapted to be engaged by a bale B, upon receipt of the same from the press, thus to close the switch.

Mounted on the end of the vehicle 17 nearest the press 10 is another switch 34 having a switch arm 34a adapted, when the vehicle is moving toward the press to engage a stop 36, thus to stop the movement of the vehicle in that direction.

From what has been described it will be seen that the object is to have the vehicle approach the press, with the carriage 23 raised to the position of FIG. 2 and stop thereat, whereupon the bale ejecting mechanisms 13 tilt the bale outwardly, whereby it rests on the member 24 and leans against and is partially supported by the carriage 23. As will later appear this closes the switch 33, thus to start the vehicle to the left as viewed in FIGS. 1 and 2, toward bale discharge position.

Referring now to FIG. 6 we show the controls and circuits which we employ to make the vehicle and carriage move from the various positions. FIG. 6 is a diagram showing the controls for dumping the bales on the floor as shown in FIGS. 1 and 2.

Starting with the vehicle in the position of FIG. 2, that is, with the switch 34 having been actuated by the stop 36 and with the carriage raised, the closing of switch 37 initiates movement of the vehicle toward the press. Thus, the closing of switch 37 energizes a relay 38. Energization of relay 38 closes contacts 38a thus establishing the holding circuit for the relay 38. Energization of relay 38 also closes contacts 38b and opens contacts 38c. The closing of contacts 38b energizes the forward coil 21a of the motor 21. The vehicle thus moves forward toward the press. It will be noted that the opening of contacts 38c is merely for safety to be sure that the reverse coil 21b of the motor is not simultaneously energized with the forward coil thereof.

The vehicle now continues to move toward the press 10 until the switch actuating rod 28 strikes the side of the press. This opens portion 29b of limit switch 29 and closes portion 29a thereof. The opening of 29b deenergizes control relay 38, stopping the forward movement of the carriage. Further, the closing of 29a energizes the coil of a control relay 42. The vehicle is now in position adjacent the press to receive the bale.

The bale from the press is placed on the carriage 23 through actuation of the bale discharge means 13, closing switch 33. Since relay 42 is closed another relay 43 is energized closing a set of contacts 43a, establishing a holding circuit, opening contacts 43b, for safety purposes, and closing contacts 43c. The closing of contacts 43c energizes the reverse coil 21b, causing the vehicle with the bale in place thereon to move down the tracks 16, away from the press.

The vehicle continues its movement from the press until the switch actuating rod 28 strikes the upstanding plate 32, if the bale in question is the first one being delivered. On contact of the arm 28 with the plate 32 (or another bale, as will be explained), portion 31a of limit switch 31 closes and portion 31b thereof opens, deenergizing the reverse coil and stopping the movement of the vehicle. Closing of limit switch 31a energizes a time delay control relay 47 closing the contacts 47a associated therewith establishing a holding circuit. Energization of the relay 47 also closes its contacts 47b which are used for later holding. The closing of the time delay contacts 47 also closes its contacts 47d, timed thus energizing another time delay control relay 48. The energization of relay 48 closes its contacts 48a and later 48b timed. The closing of timed contacts 48b energizes the forward coil 21a of the motor 21.

When the time control relay 48 times out a third set of its contacts 48c timed close, energizing the carriage motor 26 through the previously closed set of contacts 47e timed. Also, time delay contacts 47c are closed when time delay relay 47 times out, continuing to maintain the forward coil 21a of the motor energized.

At the present time in the cycle the vehicle has progressed to a point adjacent plate 32 and is now moving back toward the press and the carriage is moving downwardly. As the carriage 23 passes the angle of least repose, a portion 35a of a limit switch 35 opens, deenergizing the motor 26. At this time a second portion 35b of limit switch 35 closes starting the timer portion of another time delay relay 49. The bale is thus dumped onto the floor while the vehicle is moving toward the press with the carriage 23 lowered sufficiently to permit the bale to slide off. As the bale slides off 33 opens, but time delay relay 47 remains energized through a now closed, carriage actuated switch 40 and contacts 47b.

When time control relay 49 times out its set of contacts 49a close, restarting the carriage motor 26 to raise the carriage to bale receiving positions, opening switch 40, dropping out contacts 47e and stopping the dump motor. The vehicle continues forward toward the press until switch 34 opens by engaging the stop 36, thus opening contacts 48b and stopping the forward motion of the vehicle. A cycle is thus completed and the vehicle is in ready position, namely, ready to move toward the press with its carriage in raised, bale receiving position, upon closing of switch 37.

It will be seen that once the initial bale is delivered subsequent bales B are delivered onto the floor with the spaces 27 therebetween. This is accomplished by having the vehicle moved forwardly toward the press at the same time the carriage 23 is lowering to lay the bale on the floor. This affords means for the clamp devices of lift trucks to enter between the bales and remove them.

Referring now to FIGS. 3 to 5 inclusive we show our invention used to deposit the bales upon an intermittently operated conveyor which may be a chain or other type conveyor. Thus, we indicate the conveyor generally by the numeral 53 and it may have a pair of laterally displaced chains 54 and 56 having attachments 57 thereon for engaging the bale. Further, we may dump the bales, initially, onto a set of skate wheels indicated at 58 which in effect are rollers 59 supported in framework 61. The framework is adapted to be raised upwardly, slightly above the level of the attachments on the chains while the bale is being delivered. We may do so by means of a fluid pressure cylinder 62, the framework carrying the rollers 59 being mounted on the piston rod 63 of the cylinder.

The object here is to have the vehicle receive the bale from the press and deliver it onto the skate wheels, which at the time will be raised above the level of the cross conveyor, then immediately to lower the skate wheels so that the conveyor can convey the bale away. In order to assure that a bale is not placed on the conveyor means when another bale is interferring, we provide a safety means in the form of photocells to sense the presence of a bale, if there be one, on the conveyor, to prevent the vehicle from delivering a succeeding bale until the conveyor is clear.

The vehicle and carriage together with the switches operate essentially as already described. Referring particularly to FIG. 7 of the drawings, and assuming that the vehicle is at the ready station already described, the cycle is started by depressing the forward button 64. This energizes a relay 66 closing its associated contacts 66a for holding purposes and 66b, thus starting the forward coil 21a of the motor 21. At the same time, contacts 66c are opened to be sure that the reverse coil of the motor is not energized while the forward one is energized. The vehicle now moves forward until the sensor or switch rod 28 contacts the press, closing switch 29, thereby energizing control relay 67.

Closing of relay 67 opens its contact 67a, deenergizing control relay 66. This stops the forward motion of the vehicle with the same position to receive the bale from the press.

The bale now falls onto the carriage closing switch 33 energizing control relay 68 through the then closed contacts 67b. Energization of control relay 68 also closes its contacts 68a for holding and likewise closing its contacts 68b, energizing the reverse coil 21b of the motor 21. It will be noted that contacts 68c open for safety purposes.

The vehicle now moves toward the conveyor 53 until the switch control rod 28 engages a portion of the conveyor framework, thus closing limit switch 31. This energizes a control relay 69, opening its contacts 69a deenergizing control relay 68, thus deenergizing the reverse coil of the motor 21. The closing of control relay contacts 69b energizes control relay 71. Energization of relay 71 closes its contacts 71a for holding purposes and also closes another set of contacts 71b thus energizing the carriage motor 26.

It will be seen that the closing of switch 31 which energizes the time delay control relay 69 also closed a set of contacts 69c. The energization of these contacts supplies fluid under pressure from a source not shown to the skate wheel cylinder 63 through a solenoid control valve 72, thus to raise the skate wheels to bale receiving position. When control relay 69 times out its contacts 69d open, deenergizing the solenoid valve 72 and permitting the skate wheels to lower to the position shown in FIG. 5.

As the bale is dumped on the conveyor switch 33 opens and as the carriage continues on to the upright or bale receiving position, switch 40 opens deenergizing relay 71, thus deenergizing dump motor 26.

The bale has now been dumped onto the skate wheels, and it rolls across the conveyor striking the upstanding side 73 as a stop. The conveyor now moves the bale away.

At 74 and 76 we show photocells which are energized respectively by the light sources 77 and 78. As sown in FIG. 7 if both of the photocells 74 and 76 are blocked from their light sources then the reverse coil 21b of the motor 21 is deenergized, holding the vehicle away from the conveyor and preventing the rod 28 from engaging the side of the conveyor, thus to initiate the dumping cycle. This prevents the apparatus from dumping a bale onto the conveyor if an interferring bale is in place thereon.

In view of the foregoing it will be seen that we have invented an improved system for moving bales of fibers and the like from a baling press either to a conveyor or to a dumping place on the floor removed from the press. In either event our improved apparatus is entirely satisfactory for its intended purposes and eliminates the problem of manual moving of bales from modern, present-day automated baling presses.

While we have shown our invention in but two forms, it will be obvious to those skilled in the art that it is not so limited, but is susceptible of various other changes and modifications without departing from the spirit thereof.

What we claim is:

1. The combination with a baling press, of means to receive said bale from press, transfer it to a location removed from the press and place it at a discharge station, comprising:
   a. a powered vehicle movable from a bale receiving position adjacent the press to said discharge station,
   b. said vehicle including a powered tiltable bale receiving carriage mounted theroen,
   c. controls effective upon deposition of a bale on the carriage to energize the vehicle for movement away from the press and toward the bale discharge station, and
   d. controls effective upon substantial arrival at the discharge station to stop further movement of the vehicle in that direction and to energize the powered tiltable carriage for movement to bale discharge position.

2. Apparatus as defined in claim 1 in which said vehicle is provided with other controls effective to deposit said bales in an aligned row and spaced apart, thereby providing working spaces between adjacent bales to facilitate removing them from the row by mechanical bale pickup devices.

3. Apparatus as defined in claim 2 in which the control means therein set forth includes means to cause the vehicle to move from the discharge station toward the press as the bales are being discharged from said carriage, thereby to provide said spaces between the individual bales of a row thereof.

4. Apparatus as defined in claim 1 in which there is a conveyor at the discharge station onto which the bales are placed, and control means operable to delay the discharging of a bale from the vehicle onto the conveyor during times when a bale occupies an interferring position on the conveyor.

5. The combination with a baling press having means associated therewith to discharge a bale of fibers or the like, of means to receive said bale from the press, transfer it to a location removed from the press and place it at a discharge station, of:
   a. a powered vehicle movable from a bale receiving position adjacent the press to said discharge station,
   b. said vehicle including a tiltable bale receiving carriage mounted thereon,
   c. controls for the vehicle operable in response to a signal to cause the vehicle to move from a position removed from the press into bale receiving position relative to the press and with its carriage in bale receiving position,
   d. controls effective upon deposition of a bale on the carrier to energize the vehicle for movement away from the press and toward the bale discharge station,
   e. controls effective upon substantial arrival to the discharge station to stop further movement of the vehicle in that direction and to energize the tiltable carriage for movement to bale discharge position,
   f. controls effective upon at least partial discharge of the bale to energize the vehicle for for movement away from the discharge station toward tee press and to return the carriage to bale receiving position, and
   g. other controls effective to stop the vehicle at said position removed from the press thereby to clear the operating parts of the press which are located on tee side thereof adjacent the vehicle, whereby the vehicle comes to rest at said position ready to move into bale receiving position upon receipt of a signal.